(12) United States Patent
Schmidtler et al.

(10) Patent No.: US 10,284,570 B2
(45) Date of Patent: May 7, 2019

(54) SYSTEM AND METHOD TO DETECT THREATS TO COMPUTER BASED DEVICES AND SYSTEMS

(71) Applicant: Webroot Inc., Broomfield, CO (US)

(72) Inventors: Mauritius A. R. Schmidtler, Escondido, CA (US); Gaurav Dalal, Carlsbad, CA (US); Timur Kovalev, Broomfield, CO (US)

(73) Assignee: Wells Fargo Bank, National Association, Denver, CO (US)

( * ) Notice: Subject to any disclaimer, the term of this patent is extended or adjusted under 35 U.S.C. 154(b) by 0 days.

(21) Appl. No.: 14/340,297

(22) Filed: Jul. 24, 2014

(65) Prior Publication Data

US 2015/0033341 A1    Jan. 29, 2015

Related U.S. Application Data

(60) Provisional application No. 61/857,951, filed on Jul. 24, 2013.

(51) Int. Cl.
*H04L 29/06* (2006.01)
*G06N 99/00* (2019.01)
*G06F 21/55* (2013.01)

(52) U.S. Cl.
CPC .......... *H04L 63/14* (2013.01); *G06F 21/554* (2013.01); *G06N 99/005* (2013.01); *H04L 63/1425* (2013.01)

(58) Field of Classification Search
CPC ........ H04L 63/14; H04L 9/088; G06F 21/566

USPC .......... 726/1, 21–25; 709/224; 713/154, 160
See application file for complete search history.

(56) References Cited

U.S. PATENT DOCUMENTS

| | | | |
|---|---|---|---|
| 7,260,844 B1* | 8/2007 | Tidwell | G06F 21/577 726/22 |
| 7,594,270 B2* | 9/2009 | Church | G06F 21/552 726/23 |
| 7,895,144 B2* | 2/2011 | Angell | G06N 5/04 706/45 |
| 8,015,133 B1* | 9/2011 | Wu | H04L 63/1416 706/21 |
| 8,266,698 B1* | 9/2012 | Seshardi | G06F 21/53 726/22 |
| 8,375,446 B2* | 2/2013 | Eiland | G06F 21/55 726/23 |
| 8,418,249 B1* | 4/2013 | Nucci | G06F 21/552 706/20 |

(Continued)

*Primary Examiner* — Lynn D Feild
*Assistant Examiner* — Viral S Lakhia
(74) *Attorney, Agent, or Firm* — Merchant & Gould P.C.

(57) ABSTRACT

Aspects of the present disclosure relate to systems and methods for detecting a threat of a computing system. In one aspect, a plurality of instances of input data may be received from at least one sensor. A feature vector based upon at least one instance of the plurality of instances of input data may be generated. The feature vector may be sent to a classifier component, where a threat assessment score is determined for the feature vector. The threat assessment score may be determined by combining information associated with the plurality of instances of input data. A threat assignment may be assigned to the at least one instance of data based on the determined threat assessment score. The threat assignment and threat assessment score may be disseminated.

20 Claims, 10 Drawing Sheets

(56) References Cited

U.S. PATENT DOCUMENTS

| | | | | |
|---|---|---|---|---|
| 8,468,599 B2* | 6/2013 | McCusker | H04L 63/126 | 726/22 |
| 8,498,415 B2* | 7/2013 | Sy | H04L 9/008 | 380/255 |
| 8,578,497 B2* | 11/2013 | Antonakakis | G06F 21/577 | 726/24 |
| 8,813,236 B1* | 8/2014 | Saha | H04L 63/1408 | 726/22 |
| 8,875,286 B2* | 10/2014 | Friedrichs | H04L 63/1416 | 713/189 |
| 9,003,523 B2* | 4/2015 | Stolfo | G06F 21/564 | 726/22 |
| 9,043,894 B1* | 5/2015 | Dennison | G06F 21/552 | 726/11 |
| 9,094,288 B1* | 7/2015 | Nucci | H04L 43/026 | |
| 9,143,523 B2* | 9/2015 | Evrard | G06F 21/577 | |
| 2008/0028470 A1* | 1/2008 | Remington | G06F 21/33 | 726/25 |
| 2009/0299767 A1* | 12/2009 | Michon | G06Q 50/22 | 705/3 |
| 2010/0199352 A1* | 8/2010 | Hill | G06Q 10/10 | 726/25 |
| 2010/0204969 A1* | 8/2010 | Hariharan | G08B 31/00 | 703/2 |
| 2011/0185056 A1* | 7/2011 | McHugh | G06F 21/577 | 709/224 |
| 2012/0072983 A1* | 3/2012 | McCusker | H04L 63/126 | 726/22 |
| 2012/0144492 A1* | 6/2012 | Griffin | G06F 21/56 | 726/25 |
| 2012/0276517 A1* | 11/2012 | Banaszuk | G01C 21/00 | 434/365 |
| 2012/0317645 A1* | 12/2012 | Fortier | G06F 21/566 | 726/24 |
| 2013/0232577 A1* | 9/2013 | Watters | G06F 21/577 | 726/25 |
| 2013/0298244 A1* | 11/2013 | Kumar | G06F 21/52 | 726/25 |
| 2014/0007238 A1* | 1/2014 | Magee | G06F 21/577 | 726/24 |
| 2014/0040279 A1* | 2/2014 | Beygelzimer | G06F 17/30 | 707/748 |
| 2014/0096215 A1* | 4/2014 | Hessler | H04L 63/0869 | 726/7 |
| 2015/0135262 A1* | 5/2015 | Porat | G06F 21/552 | 726/1 |

\* cited by examiner

SYSTEM AND METHOD TO DETECT THREATS TO COMPUTER BASED DEVICES AND SYSTEMS

PRIORITY

This application claims the benefit of, and priority to, U.S. Provisional Application No. 61/857,951, filed on Jul. 24, 2013, which is hereby incorporated by reference in its entirety.

BACKGROUND

There is an increase in the proliferation of threats with the increased utilization of computer based devices and systems such as desktops, smart-phones, tablets, smart televisions, networks, and the Internet, a proliferation of threats exists with the usage of such devices and systems. The threats, which may be generated by malicious software, include, but are not limited to, financial fraud, loss of privacy, and loss of critical information. Furthermore, threats may evolve and change over time to avoid detection. It is with respect to this general environment that aspects of the present disclosure have been contemplated.

SUMMARY

Aspects of the present disclosure relate to detecting threats to a computing system. A threat identification system may detect threats by analyzing and/or processing a variety of data inputs. The variety of data inputs may be associated with a variety of different types of threats. In this regard, in contrast to identifying threats independently, the threat identification system may combine information from the variety of data inputs to determine a threat in an instance of data from the input data. In one case, the threat identification system may be trained using instances of data that have identified threat assignments. For example, instances of data that have identified threat assignments are instances of data that have a known type of threat. Threat assessment models may be created from training the threat identification system. The threat assessment models may include individual models for a variety of threat types and combined models that process information from a plurality of the individual models. In this regard, a combined model may determine a threat of a first type by utilizing information associated with a threat of a second type.

By creating trained models in the threat identification system, the threat identification system may automatically detect threats that have evolved and changed over time and that have never been observed by the threat identification system. In one example, feature vectors representing information associated with instances of data may be generated and sent to a classifier to determine a threat assessment score for the feature vectors. The threat assessment score may be determined by utilizing information from the threat assessment models. The threat assessment score may facilitate automatically determining whether the instance of data is a threat or not. For example, when the threat assessment score is above a predetermined threshold, this may indicate that the instance of data is a threat. In some cases, the classifier may not determine whether a threat exists or not based on the threat assessment score. As such, the threat assessment score may be reviewed by a third party source to determine whether a threat exists or not. When the third party source determines whether a threat exists or not, the feature vector and determined threat may be sent back to the threat assessment models for retraining. As such, the threat assessment models are consistently retrained to identify changed and evolved types of threats automatically. The threat assignment information and threat assessment scores may be disseminated to a computing device, such as an endpoint, to protect the endpoint from potential threats. In another case, the threat assignment information and threat assessment scores may be disseminated to a database for storage and/or a published white/black-list. This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Aspects of the present disclosure relate to systems and methods for the detection of threats to computer systems. A threat identification system may identify and classify potential threats to a computing system. The threat identification system may use machine learning techniques to automate the identification and classification of the potential threats. In embodiments, a sensor system may collect instances of data from processes, activities, objects, and the like, that are potentially harmful to a computing system. The instances of data may be stored in a repository such that the instances of data may be analyzed and/or assessed by a human reviewer and/or automatically by the threat identification system. The instances of data may be analyzed and/or accessed to determine whether the instances of data have an assigned threat assignment. If an instance of data has a threat assignment, the threat assignment and, in embodiments, a feature vector representation of the instance of data, may be sent to a threat assessment model. In one embodiment, the threat assessment model may be trained by applying various machine learning techniques to the threat assignments and/ or feature vector representations. In cases where an instance of data does not have a threat assignment, the threat assessment model may determine threat assessment scores for the instances of data that may be used to determine a threat assignment. The threat assignments may indicate what action should be taken to protect a computing system from a potential threat. While specific threat detection methods are described, one of skill in the art will appreciate that any type of threat detection method may be employed without departing from the scope of this disclosure.

Figure 1:
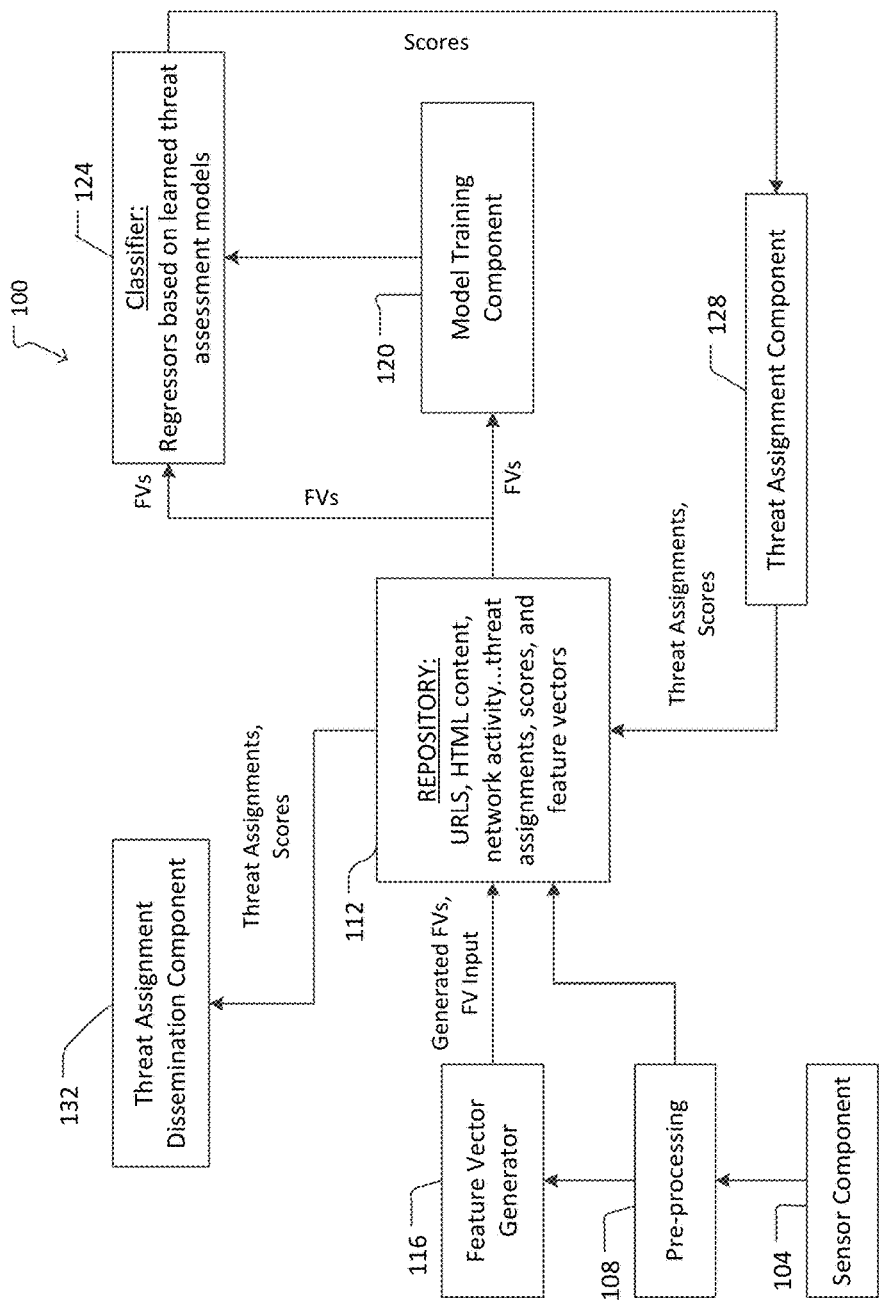
FIG. 1 illustrates an exemplary threat identification system that may be employed by a computing system.

FIG. 1 illustrates an exemplary threat identification system 100 that may be employed by a computing system. The exemplary threat identification system 100 includes various components for detecting a potential threat to the computing system. As shown in FIG. 1, a representative example of a threat identification system 100 includes a sensor component 104, a pre-processing component 108, a feature vector generator 116, a repository 112, a threat assignment component 128, a model training component 120, a classifier component 124, and a threat assignment dissemination component 132. The sensor component 104 may automatically collect data from processes, activities, objects, and the like, that are potentially harmful to the computing system. The sensor component 104 may utilize one or more web crawlers, sensors on a customer endpoint (e.g., smartphone, tablet, laptop, etc.), honey pots, third party applications, proxy servers, and/or original equipment manufacturers (OEM) partners for collecting instances of data, which will be described in detail below.

In one aspect, the instances of data may include at least IP addresses, URLs, HTML content, Geo-location information, Internet Service Provider (ISP) data, who-is data, static executable data, runtime executable data, static mobile device application data, runtime mobile application data, and network activity data. While specific types of data have been described herein, one of skill in the art will appreciate that the instances of data may have other types. The collected instances of data from the sensor component 104 may be sent to the pre-processing component 108 for processing. The pre-processing component 108 may aggregate the data collected by the sensor component 104 and store the aggregated data in the repository 112.

The repository 112 may include an interface for the threat assignment component 128 to review and analyze the aggregated instances of data. The threat assignment component 128 may include threat assignment sources to review and analyze the aggregated instances of data. The threat assignment sources may include human researchers, crowd sourcing, and third party sources, to name a few. In one case, the threat assignment sources may search for suspicious patterns in the aggregated instances of data, detect harmful instances of the aggregated data, and assign threat assessments (e.g., threat assignments) to potential harmful instances of data in the repository 112. The threat assignments may include whether the instance of data is a threat (e.g., malware, phishing site, etc.) or is not a threat. In one example, threat assignments may include a reputation of a URL, a reputation of an IP address, phishing sites, malware, suspicious network activity, suspicious applications, and no threat. In this regard, when the instances of data are reviewed and analyzed, harmful instances of data that are detected may be given a threat assignment based on the type of threat detected. When no threat is detected, the threat assignment may be no threat.

In one aspect, the instances of data in the repository 112 may be processed to generate various representations of the instances of data. For example, one representation of the instances of data may include a binary representation of an instance of data. In another example, the representations of the instances of data may include numerical and/or categorical values. In yet another example, the representations of the instances of data may include any representation suitable for encoding sequence information, e.g., n-grams. The generated representations of instances of data may be encoded as feature vectors by the feature vector generator 116. In one aspect, the representations of the instances of data and the encoded feature vectors may be based on the type of threat assessment model that receives the feature vectors. For example, if the instance of data is an executable file, an executable malware/virus model may process the executable files corresponding feature vector. As such, the encoded feature vector of the executable file may be generated such that the executable malware/virus model can understand and process the data. The generated feature vectors may be stored in the repository 112 in addition to the instances of data associated with the feature vectors and the determined threat assignments. In this regard, the repository 112 may include feature vectors associated with instances of data, instances of data with determined threat assignments, and/or instances of data without determined threat assignments (e.g., with unknown threat assignments).

In one aspect, various machine learning techniques may be utilized with the model training component 120. For example, exemplary machine learning techniques that may be utilized by the embodiments disclosed herein may include support vector machines (SVM), maximum entropy discrimination (MED), boosted regression/classification trees, feed forward neural networks (FNN), and/or deep believe networks (DBN). In this regard, a subset of the instances of data with determined threat assignments and/or their corresponding feature vectors may be input to the model training component 120. The model training component 120 may include a variety of threat assessment models such as individual base models, intermediate combined models, and a final model, which will be described in detail below. In one aspect, the threat assessment models may be trained using the subset of the instances of data with determined threat assignments and their corresponding feature vectors. In this regard, the threat assessment models can determine a threat assessment score for instances of data with unknown threat assignments. In one example, the threat assessment score may be based on a probability that the instance is a threat.

In one aspect, the classifier component 124 may determine a threat assessment score and may receive the generated feature vectors from the repository 112. As such, the generated feature vectors may be sent to both the classifier component 124 and the model training component 120. In this regard, the generated feature vectors may be sent to the model training component 120 when a threat assignment has been determined for the corresponding feature vector. As such, the threat assessment models may be trained using the feature vectors and their corresponding threat assignments. Alternatively, the generated feature vectors may be sent to the classifier component 124 when a threat assignment is unknown for the corresponding feature vector. When the feature vector is sent to the classifier component 124, the classifier component may determine a threat assessment score for the received feature vector. In one example, the threat assessment score may be determined based on the received feature vector (e.g., the representation information of the instance) and information from the trained threat assessment models.

In one case, when the determined threat assessment score is above a first predetermined threshold value, there is a high probability that the instance associated with the received feature vector is a threat. In another case, when the determined threat assessment score is below a second predetermined threshold value, there is a low probability that the instance associated with the received feature vector is a threat. In another case, when the determined threat assessment score is between the first predetermined threshold value and the second predetermined threshold value, there may be a low probability that the instance associated with the received feature vector is either a threat or not a threat (e.g., it is unknown whether the instance is a threat or not a threat). In one case, the first and second predetermined threshold values may be set by a user of a computing device of the threat identification system 100. In another case, the first and second predetermined threshold values may be set automatically by the threat identification system 100.

In one aspect, the determined threat assessment score for the instance of data associated with the received feature vector may be sent to the threat assignment component 128. The threat assignment component 128 may give the instance of data associated with the threat assessment score a threat assignment based on the threat assessment score. For example, when the determined threat assessment score is between a first predetermined threshold value and a second predetermined threshold value (e.g., it is unknown whether the instance of data associated with the received feature vector is a threat or not a threat), the threat assignment component 128 may review the feature vector and the threat assessment score and determine whether the instance of data associated with the feature vector is a threat or not and assign a corresponding threat assignment to the feature vector. In this example, the feature vector and its corresponding threat assignment may be sent to the model training component 120 to retrain the threat assessment models. The threat assessment score and its corresponding threat assignment may also be sent to the assignment dissemination component 132, as will be discussed in detail below.

In another example, when the determined threat assessment score is above the first predetermined threshold value, a positive threat assignment may be given to the instance of data associated with the received feature vector, indicating that a threat exists. In this case, the threat assessment score and its corresponding threat assignment may also be sent to the assignment dissemination component 132, as will be discussed in detail below. In another example, when the determined threat assessment score is below the second predetermined threshold value, a negative threat assignment may be given to the instance of data associated with the received feature vector indicating that a threat does not exist. In this case, the threat assessment score and its corresponding threat assignment may also be sent to the assignment dissemination component 132, as will be discussed in detail below.

When a threat assignment is determined for an instance of data by the threat assignment component 128 or the threat assessment score is determined to be above the first predetermined threshold value or below the second predetermined threshold value, the threat assignment and the corresponding threat assessment score may be sent to the threat assignment dissemination component 132. When the threat assignment dissemination component 132 receives the threat assignments and threat assessment scores, the threat assessment dissemination component 132 may disseminate the threat assignments and/or threat assessment scores to a customer endpoint, a database/server, and/or a published white/blacklist. In one example, the threat assignment is sent to an endpoint device such that when a user of the endpoint device attempts to execute the instance of data associated with the threat assignment, the endpoint device may employ a counter measure or otherwise protect itself, data, the user, etc. when the instance is assigned a threat. In another example, the threat assignments and/or the threat assessment scores associated with the instances of data are sent to a database for storage and/or a black/white-list for publishing. In yet another example, the threat assignments and/or threat assessment scores may be made available through web-services accessible view the Internet and/or through Software Development Kits.

In one aspect, the feature vectors are dynamically generated at the endpoint device and transmitted to the database/server over a network. The database/server may determine the threat assessment scores associated with the feature vectors transmitted over the network. The determined threat assessment scores may be transmitted back to the endpoint device via the network. When the endpoint device receives the threat assessment scores, the endpoint device may determine the threat assignment and protect the endpoint device from a threat based on the threat assignment. In another aspect, the threat assessment models are distributed to the endpoint device. In this regard, the threat assessment scores may be determined by the endpoint device. In yet another aspect, some of the threat assessment models may be located at the endpoint device and some of the threat assessment models may be located at the server such that threat assessment scores may be determined at the endpoint device and/or the server.

While specific components are illustrated in the exemplary system 100, one of skill in the art will appreciate that other systems may include additional or fewer components and that the exemplary system 100 is provided for illustrative purposes. As such, the aspects disclosed herein may be practiced with different systems without departing from the spirit or scope of this disclosure.

Figure 2:
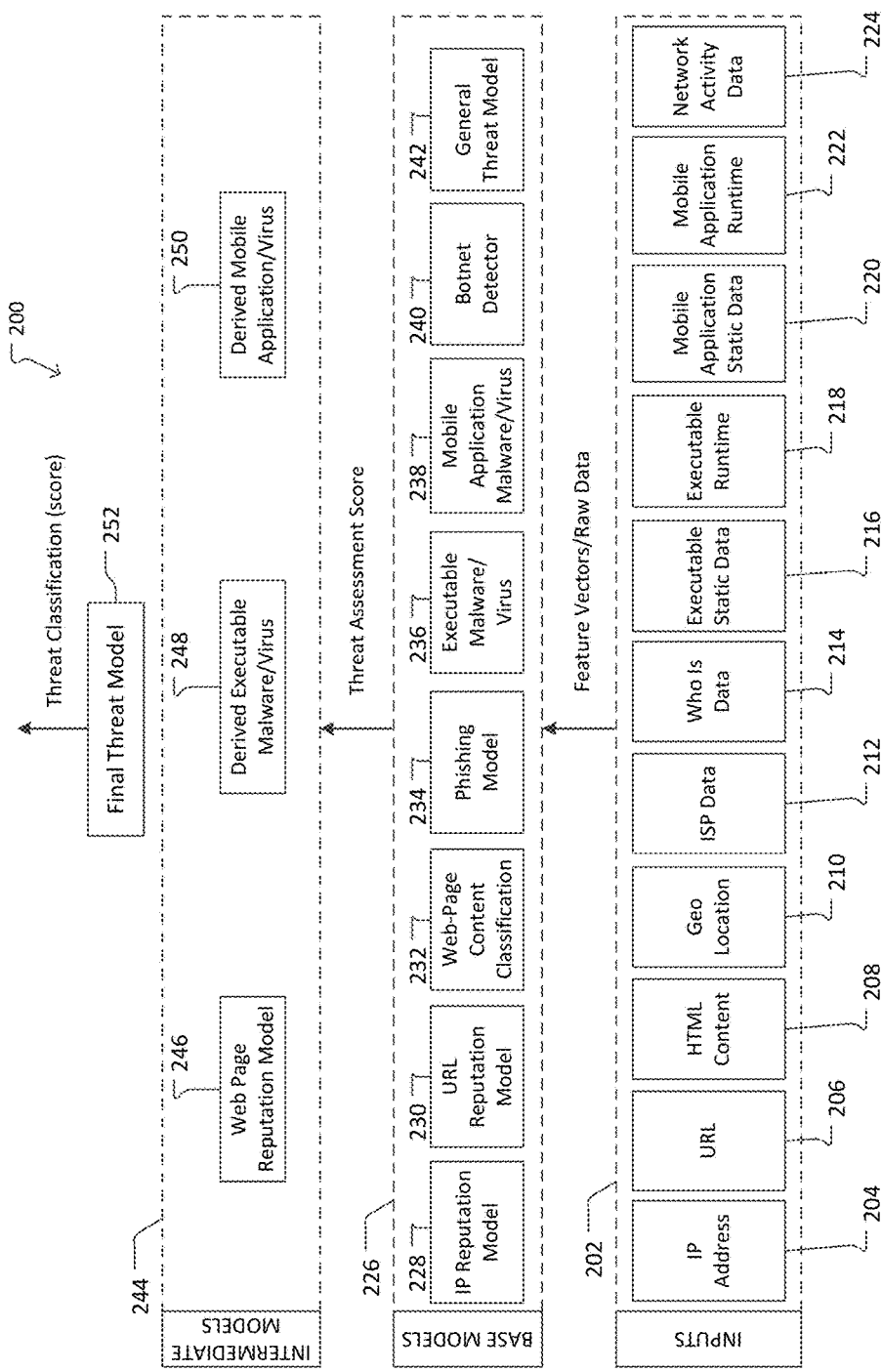
FIG. 2 illustrates various threat assessment models of a model training component, according to one or more embodiments of the present disclosure.

FIG. 2 illustrates various threat assessment models that may be stored or otherwise accessible by the model training component 120, according to one or more embodiments of the present disclosure. As discussed above, the model training component 120 may include a variety of threat assessment models such as individual base models, intermediate combined models, and a final model. As illustrated in FIG. 2, the individual base models 226 may include an IP reputation model 228, a URL reputation model 230, a webpage content classification model 232, a phishing model 234, an executable malware/virus model 236, a mobile device application malware/virus model 238, a botnet detector 240, and a general threat model 242. As discussed above, instances of aggregated data may be stored in repository 112 and feature vectors corresponding to the instances of data may be generated and input to the model training component 120. In this regard, the input data 202 may include the instances of data. As discussed above, in one aspect, the instances of data may include IP addresses 204, URLs 206, HTML content 208, Geo-location information 210, Internet Service Provider (ISP) data 112, who-is data 214, static executable data 216, runtime executable data 218, static mobile device application data 220, runtime mobile application data 222, and network activity data 224.

In some aspects, the generated feature vectors for each type of instance of data may be input to a different base model 226. In one case, IP addresses 204 and Geo-location information 210 may be input to the IP reputation model 228 for training and/or processing. In another case, URLs 206, HTML content 208, Geo-location information 210, ISP data 212, and who-is data 214 may be input to the URL reputation model 230 for training and/or processing. In another case, HTML content 208 may be input to the webpage content classification model 232 for training and/or processing. In another case, IP addresses 204, URLs 206, HTML content 208, Geo-location information 210, ISP data 212, and who-is data 214 may be input to the phishing model 234 for training and/or processing. In another case, static executable data 216 and runtime executable data 218 may be input to the executable malware/virus model 236 for training and/or processing. In another case, the static mobile device application data 220 and runtime mobile device application data 222 may be input to the mobile device application malware/virus model 238 for training and/or processing. In another case, the network activity data 224 maybe input to the botnet detector 240 for training and/or processing. In another case, IP addresses 204, URLs 206, HTML content 208, Geo-location information 210, Internet Service Provider (ISP) data 112, who-is data 214, static executable data 216, runtime executable data 218, static mobile device application data 220, runtime mobile application data 222, and network activity data 224 may be input to the general threat model 242 for training and/or processing.

As discussed above, the model training component 120 may include a variety of threat assessment models including at least intermediate combined models. In this regard, intermediate models 244 may include hierarchical models, linearly blended models, boosted models, and models that are trained from combining various feature vectors of the instances of data (e.g., inputs 202). Specifically, as illustrated in FIG. 2, the intermediate models 244 may include a webpage reputation model 246, a derived executable malware/virus model 248, and a derived mobile device application malware/virus model 250. In this regard, the base models 226 may determine threat assessment scores for instances of data using the received feature vectors and send the determined threat assessment scores to the intermediate models 244. In one exemplary aspect, the phishing model 234 may determine a threat assessment score for a webpage that indicates how likely the webpage is a phishing site. In this regard, the input information used by the phishing model 234 to determine the threat assessment score may include the IP addresses 204, URLs 206, HTML content 208, Geo-location information 210, ISP data 212, and who-is data 214. In the exemplary aspect, the threat assessment score for each instance may be based on a probability that the instance is a phishing site. The determined threat assessment score for each instance may be sent to at least one intermediate model 244.

When the threat assessment scores are determined by the base models 226, the threat assessment scores may be sent to the intermediate models 244. In one case, the threat assessment scores from the reputation model 228 are sent to the webpage reputation model 246 and the derived executable malware/virus model 248. In one case, the threat assessment scores from the URL reputation model 230 are sent to the webpage reputation model 246 and the derived executable malware/virus model 248. In one case, the threat assessment scores from the webpage content classification model 232 are sent to the webpage reputation model 246 and the derived executable malware/virus model 248. In one case, the threat assessment scores from the phishing model 234 are sent to the webpage reputation model 246. In one case, the threat assessment scores from the executable malware/virus model 236 are sent to the derived executable malware/virus model 248. In one case, the threat assessment scores from the mobile device application malware/virus model 238 are sent to the derived mobile device application malware/virus model 250. In one case, the threat assessment scores from the botnet detector 240 are sent to the webpage reputation model 246, the derived executable malware/virus model 248, and the derived mobile device application malware/virus model 250. In one case, the threat assessment scores from the general threat model 242 are sent to the final threat model 252.

Using a combination of threat assessment models (e.g., base models 226, intermediate models 244, and the final threat model 252) may facilitate accurate and robust threat assignments for instances of data that are incomplete and/or have never been observed by the threat identification system 100. For example, an instance such as an executable file may not have a threat assignment due to incomplete information from the executable file. In this case, a feature vector may be generated and sent to the classifier component 124. In one example, at least one of the intermediate models 244 may have information and/or a threat assessment score associated with the IP address through which the executable file was obtained. In this regard, the intermediate model 244 may determine a threat assessment score for the executable file using the information and/or threat assessment score associated with the IP address. As such, the classifier component 124 may use the information from the intermediate models 244 and the received feature vector to determine a threat assessment score. As discussed above, the threat assessment score may then be used to determine, with high confidence, whether the instance of data has a threat assignment.

As more information associated with the executable file becomes available, the generated feature vectors and corresponding threat assessment scores associated with the executable file may be updated. In one example, as discussed above, the threat assessment scores may be sent to the threat assignment component 128 where a threat assignment may be assigned to the executable file. If the executable file is given a threat assignment by one of the threat assignment sources, the threat assessment models may be re-trained with the threat assignment and corresponding feature vector.

In one aspect, the threat identification system 100 may determine the threat assignments and threat assessment scores of all the instances in the repository 112. The results of the determined threat assignments and threat assessment scores of all the instances in the repository 112 may be stored with the threat assignments that have been determined by the threat assignment component 128 (e.g., human researchers, crowd sourcing, and third party sources). When there is a conflict between determined threat assignments for an instance, logic may be applied to resolve the conflict. In one case, the logic includes a rule that threat assignments determined by a human researcher/reviewer overrule all other threat assignments.

While specific examples have been described to illustrate the base models 226 receiving various feature vectors from inputs 202 and intermediate models 244 receiving threat assessment scores from various base models 226, one of skill in the art will appreciate that other examples may include the base models 226 receiving feature vectors from inputs 202 different from those described and the intermediate models 244 receiving threat assessment scores from base models 226 different from those described and that the exemplary aspects are provided for illustrative purposes. As such, the aspects disclosed herein may be practiced using various combinations of inputs 202, base models 226, intermediate models 244, and the final threat model 252 without departing from the spirit or scope of this disclosure.

Figure 3:
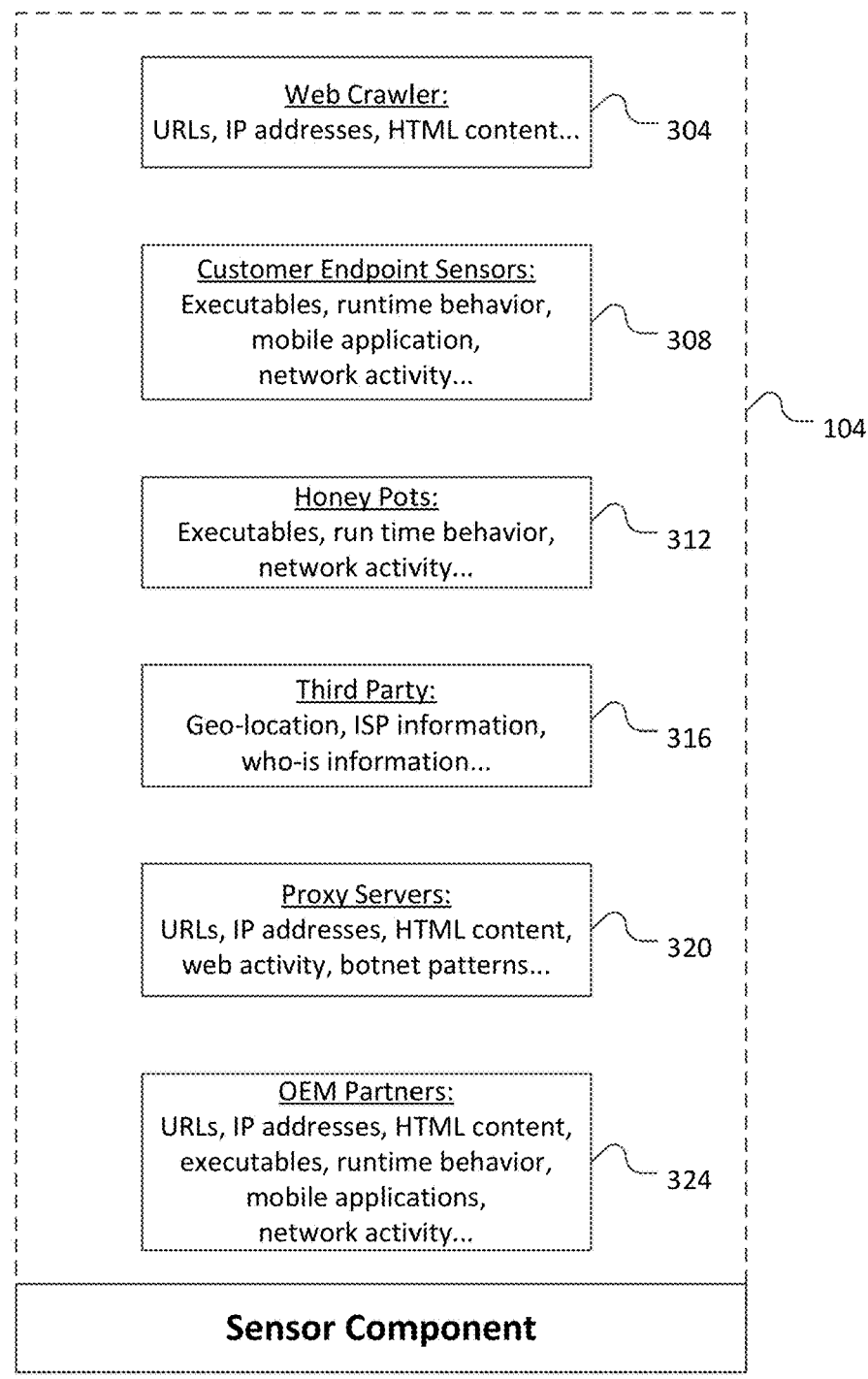
FIG. 3 illustrates an exemplary embodiment of a sensor component for detecting a threat to a computing system.

FIG. 3 illustrates an exemplary embodiment of a sensor component 104. The sensor component 104 may include a web crawler 304, customer endpoint sensors 308, honey pots 312, third party applications 316, proxy servers 320, and OEM partners 324. The web crawler 304 may accumulate instances of data such as URLs, IP addresses, and HTML content. The customer endpoint sensors 308 may accumulate instances of data such as executable information, runtime behavior of executables, mobile device applications, and network activity. The honey pots 312 may accumulate instances of data such as executable information, runtime behavior of executables and network activity. The third party applications 316 may accumulate instances of data such as Geo-location information of IP addresses, ISP (Internet Service Provider) information, and who-is information. The proxy servers 320 may accumulate instances of data such as URLs, IP addresses, HTML content, web activity, and hornet patterns. The OEM partners 324 may accumulate instances of data such as URLs, IP addresses, HTML content, executable information, behavior data on mobile device applications, runtime behavior of executables and network activity. In this regard, as discussed above relative to FIG. 1, the instances of collected data are pre-processed and stored in the repository 112.

Figure 4:
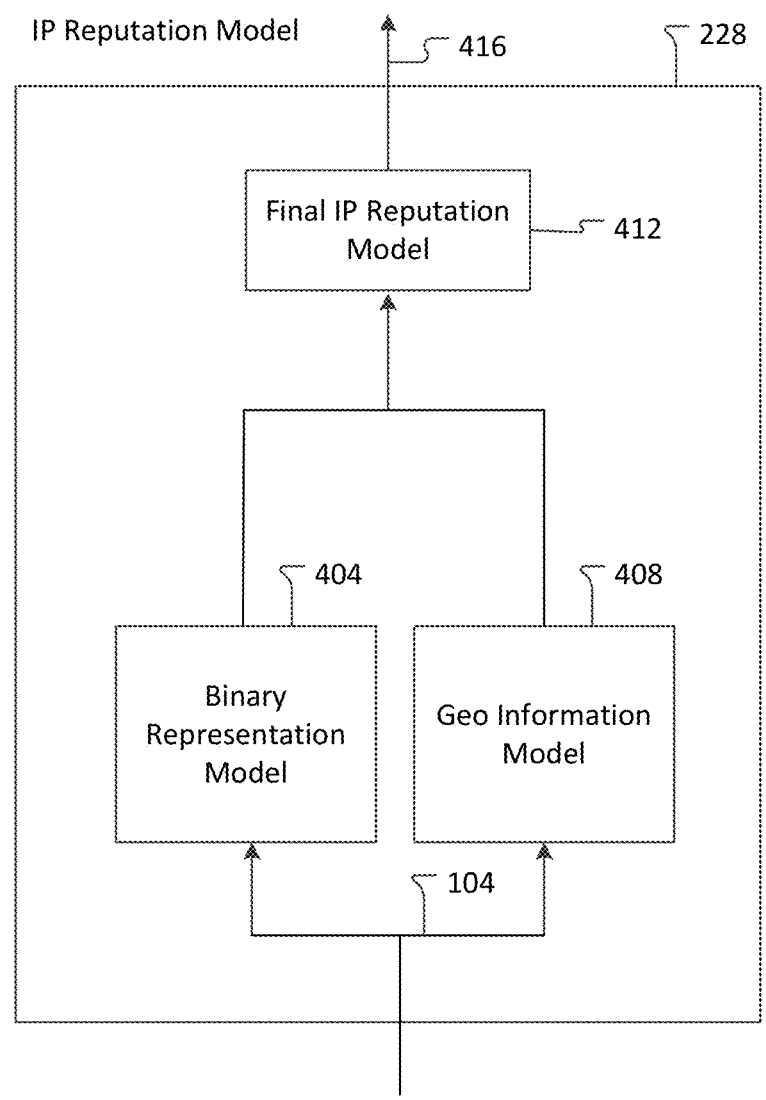
FIG. 4 illustrates an exemplary embodiment of an IP reputation model for detecting a threat to a computing system.

FIG. 4 illustrates an exemplary embodiment of an IP reputation model 228. The IP reputation model 228 may include a binary representation model 404, a Geo-information model 408, and a final IP reputation model 412. The inputs from the sensor component 104 (e.g., instances of data in the form of vector features) may be received at the binary representation model 404 and the Geo-information model 408 for processing. For example, as discussed above, the IP addresses 204 and Geo-location information 210 may be input to the IP reputation model 228. The binary representation model 404 may assess a binary representation of the IP addresses 204 input to the binary representation model 404. The binary representation model 404 may determine that at least some clusters of the IP addresses 204 may not be a threat and that at least some clusters of the IP addresses 204 may be a threat.

The Geo-information model 408 may receive Geo-location information such as locality information and ASN information, the type of connection, the speed of the connection, etc. The Geo-information model 408 may assess the Geo-location information to determine the information that indicates a threat and the information that does not indicate a threat. Both the binary representation model 404 and the Geo-information model 408 may determine threat assessment scores based on an analysis of the IP addresses 204 and Geo-location information 210. The threat assessment scores may be sent to the final IP reputation model 412 where the threat assessment scores are combined to create a final IP reputation threat assessment score 416. The final IP reputation threat assessment score 416 may be sent to an intermediate model.

Figure 5:
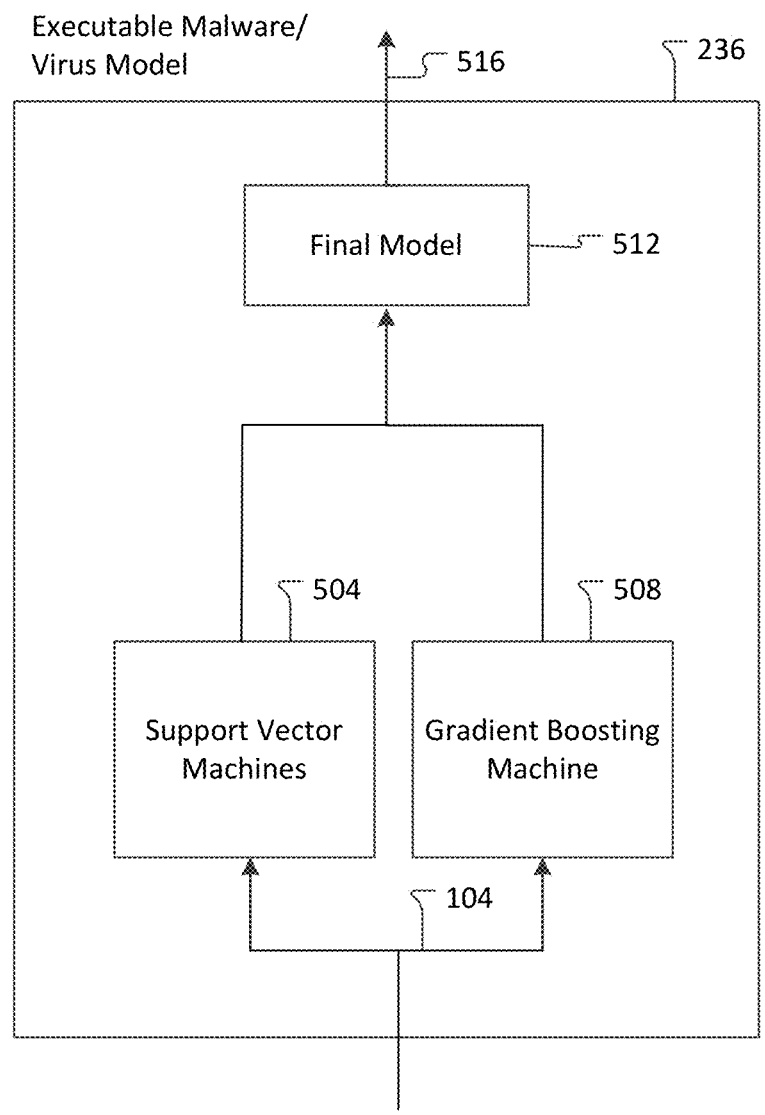
FIG. 5 illustrates an exemplary embodiment of an executable malware/virus model for detecting a threat to a computing system.

FIG. 5 illustrates an exemplary embodiment of an executable malware/virus model 236. The executable malware/virus model 236 may include a support vector machine 504, a gradient boosting machine 508, and a final model 512. The inputs from the sensor component 104 (e.g., instances of data in the form of vector features) may be received at the support vector machine 504 and/or gradient boosting machine 508 for processing. For example, as discussed above, the static executable data 216 and runtime executable data 218 may be input to the executable malware/virus model 236 for training and/or processing. In one aspect, the support vector machine 504 and/or the gradient boosting machine 508 are standard machine learning techniques.

Both the support vector machine 504 and the gradient boosting machine 508 may determine threat assessment scores based on an analysis of the static executable data 216 and runtime executable data 218. The threat assessment scores may be sent to the final model 512 where the threat assessment scores are combined to create a final threat assessment score 516. In one example, the threat assessment scores are combined by using boosting and/or a neural network. The final threat assessment score 516 may be sent to an intermediate model 244.

Figure 6:
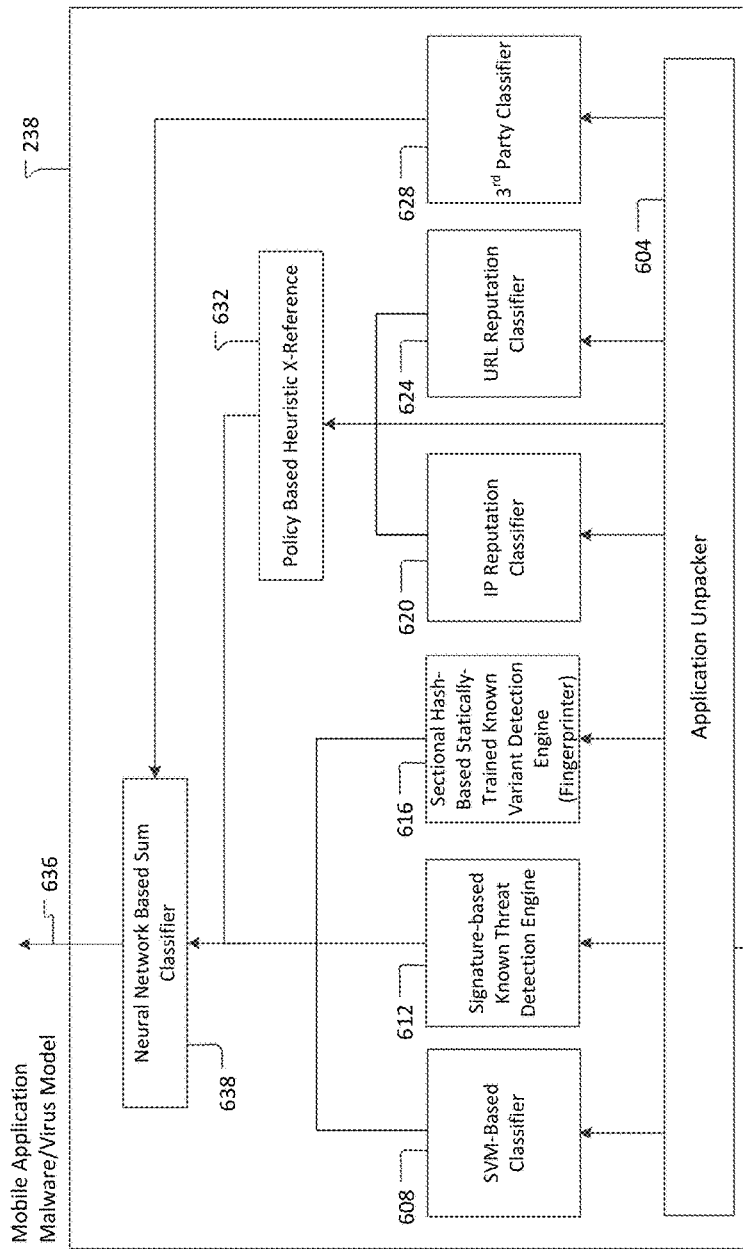
FIG. 6 illustrates an exemplary embodiment of a mobile device application malware/virus model for detecting a threat to a computing system.

FIG. 6 illustrates an exemplary embodiment of a mobile device application malware/virus model 238. The mobile device application malware/virus model 238 may include an application unpacker 604, a SVM-based classifier 608, a threat detection engine 612, a finger printer 616, an IP reputation classifier 620, a URL reputation classifier 624, a third party classifier 628, a heuristic classifier 632, and a sum classifier 638. The inputs from the sensor component 104 (e.g., instances of data in the form of vector features) may be received at the application unpacker 604 for processing. For example, as discussed above, the static mobile device application data 220 and runtime mobile device application data 222 may be input to the mobile device application malware/virus model 238 for training and/or processing. In one aspect, the application unpacker 604 may verify the validity of a mobile device application and extract the mobile device application components. The SVM-based classifier 608 may convert selected mobile device application attributes into feature vectors and send the selected mobile device application attributes into an actively trained classifier. In one example, the SVM-classifier 608 may receive permission paths, digital certificate information, feature paths, and the like, from the application unpacker 604. In this regard, the SVM-classifier 608 may output a numeric score that identifies an affiliation with a classification mode.

The threat detection engine 612 may perform a signature-based scan of the mobile device application and generate a binary result based on a threat detection or lack thereof. In this regard, the threat detection engine 612 may receive a hash of the mobile device application binary, a package/bundler identifier, an application manifest, and a certificate fingerprint. The threat detection engine 612 may output a malware family affiliation and/or a determination of whether the received data is a potential threat or not (e.g., whether the data is good or bad). The finger printer 616 may perform a statistical evaluation of the mobile device application's sectional hashes and determine a probability that the application contains binary code that has been observed previously in mobile device applications received during training. In embodiments, finger printer 616 may receive sectional MD5 hashes of an executable portion of the mobile device application (e.g., a DEX file). In other embodiments, other hashing functions, both cryptographic or otherwise, may be employed without departing from the scope of this disclosure. The finger printer 616 may output determination of whether the received data is a potential threat or not (e.g., whether the data is good or bad) and a confidence metric associated with the determination.

The IP reputation classifier 620 may perform IP reputation cross-referencing using IP addresses extracted from the mobile device application at runtime and source code. The IP reputation classifier 620 may receive IP addresses associated with the mobile device application. The IP addresses may be extracted from source code and network runtime capture. The IP reputation classifier 620 may output IP reputation/classification, IP threat categories, and IP Geo-location information. The URL reputation classifier 624 may perform URL reputation cross-referencing using URLs extracted from the mobile device application runtime capture and source code. The URL reputation classifier 624 may receive URLs associated with the mobile device application. The URLs may be extracted from source code and network runtime capture. The URL reputation classifier 624 may output IP addresses that are associated with the URLs and a URL category and categorization confidence score.

The third party classifier 628 may perform mobile device application lookup against third party application analysis engines and compute classification determination based on the lookup results. The third party classifier 628 may receive an application MD5. The third party classifier 628 may output a determination of whether the received data is a potential threat or not (e.g., whether the data is good or bad) and a confidence score based on weighted third party classification results. The heuristic classifier 632 may perform policy based classification of a mobile device application by using a weighted sum of tangible mobile device application attributes and attributes derived from cross-referencing with previously classified mobile device applications. The heuristic classifier 632 may receive permission paths, known sources of the mobile device application, cross-references of the digital certificate fingerprint, other classifier results, and the like. The heuristic classifier 632 may output a weighted sum of determinations based on available mobile device application attributes. The sum classifier 638 may be a Neural Network based sum classifier that normalizes the results of other statistical classifiers and sends the associated classification values into a back-propagation trained Artificial Neural Network. The sum classifier 638 may receive the outputs from the SVM-based classifier 608, the threat detection engine 612, the finger printer 616, the third party classifier 628, and the heuristic classifier 632. The sum classifier 638 may output a threat assessment score 636 representing a combined threat/no threat determination. The threat assessment score 636 may be output to an intermediate model 244 (FIG. 2).

Figure 7:
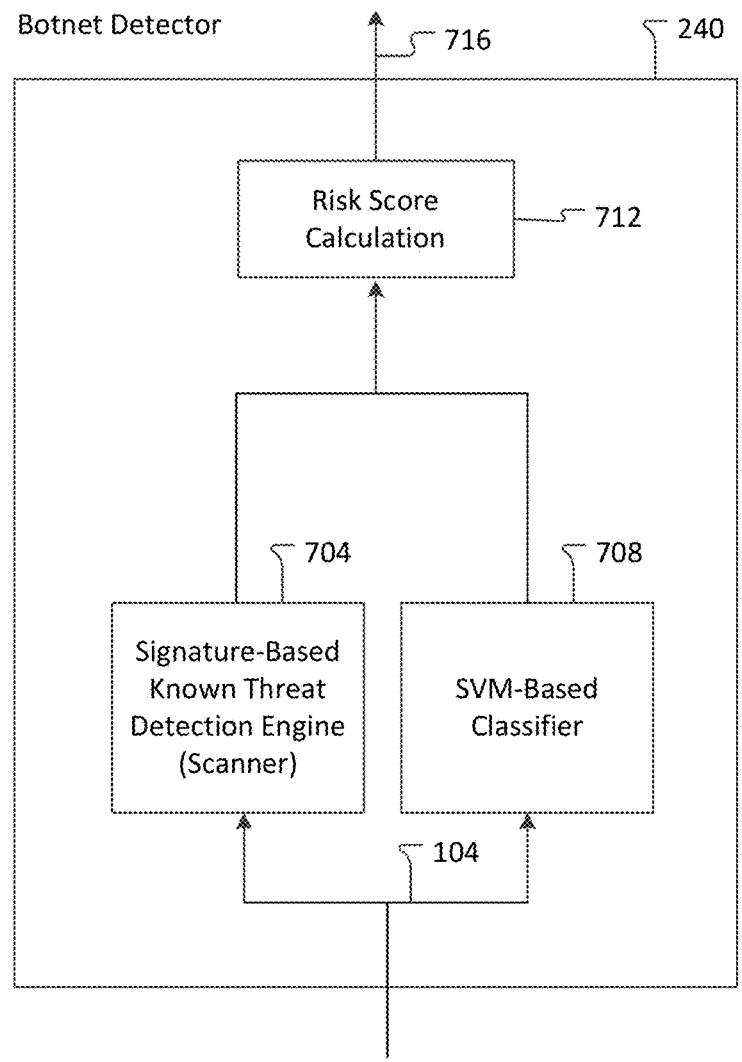
FIG. 7 illustrates an exemplary embodiment of botnet detector for detecting a threat to a computing system.

FIG. 7 illustrates an exemplary embodiment of botnet detector 240. The botnet detector 240 may include a scanner 704, a SVM-based classifier 708, and a risk score calculator 712. The inputs from the sensor component 104 (e.g., instances of data in the form of vector features) may be received at the scanner 704 and the SVM-based classifier 708 for processing. For example, as discussed above, the network activity data 224 maybe input to the botnet detector 240 for training and/or processing. The scanner 704 may perform signature-based scans of URLs and generate triggered detections. In this regard, the scanner 704 may receive Network IP addresses HTTP, DNS, SSH, FTP requests/responses, TCP/UDP packet headers, and TCP flags.

As discussed above, the SVM-based classifier 708 may convert selected mobile device application attributes into feature vectors and send the selected mobile device application attributes into an actively trained classifier. The SVM-based classifier 708 may receive inputs similar to those received at the scanner 704 such as Network IP addresses HTTP, DNS, SSH, FTP requests/responses, TCP/UDP packet headers, TCP flags, and the like. Both the scanner 704 and the SVM-based classifier 708 may determine threat assessment scores based on an analysis of the inputs. The threat assessment scores may be sent to the risk score calculator 712 where the threat assessment scores are combined to create a final threat assessment score 716. The final threat assessment score 716 may be sent to an intermediate model.

Figure 8:
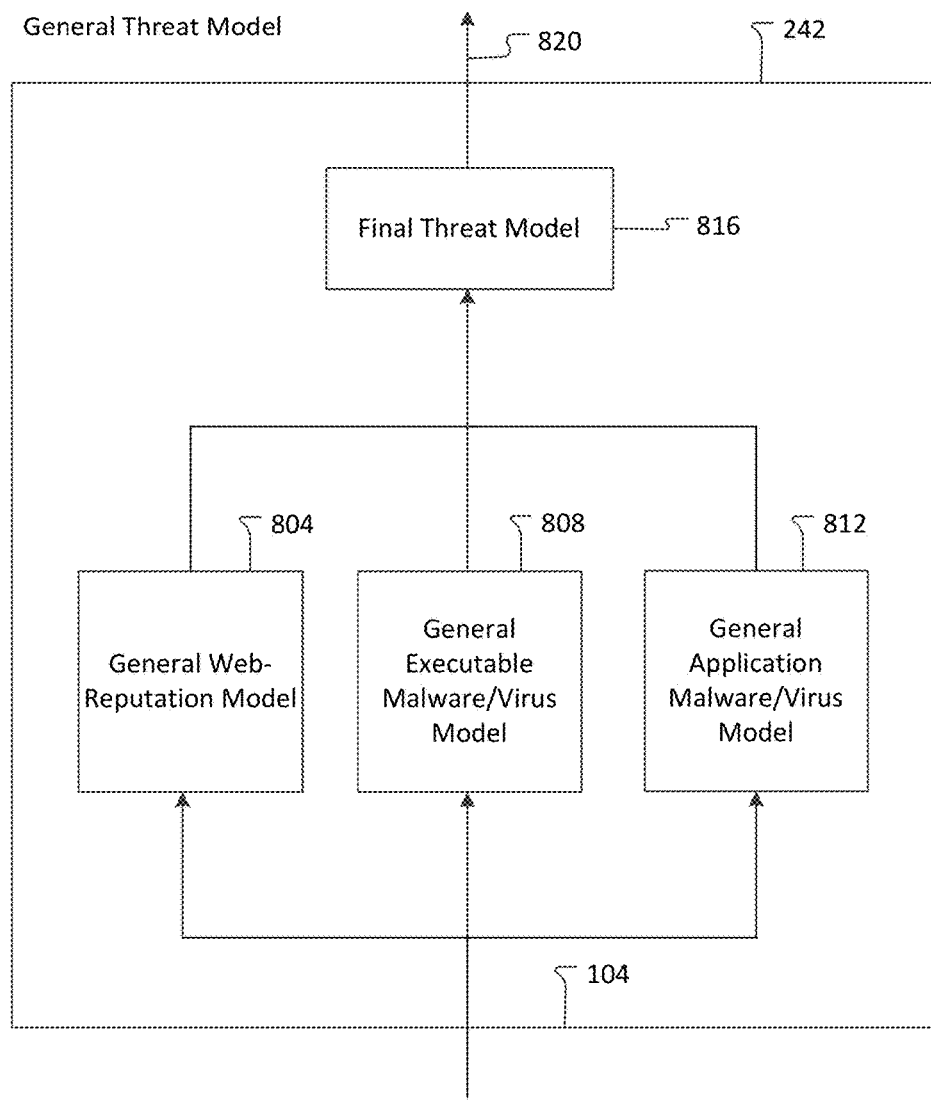
FIG. 8 illustrates an exemplary embodiment of a general threat model for detecting a threat to a computing system.

FIG. 8 illustrates an exemplary embodiment of a general threat model 242. The general threat model 242 may include a general web reputation model 804, a general executable malware/virus model 808, a general device application malware/virus model 812 and a final threat model 816. The inputs from the sensor component 104 (e.g., instances of data in the form of vector features) may be received at the general web reputation model 804, the general executable malware/virus model 808, and the general device application malware/virus model 812 for processing. For example, as discussed above, IP addresses 204, URLs 206, HTML content 208, Geo-location information 210, Internet Service Provider (ISP) data 112, who-is data 214, static executable data 216, runtime executable data 218, static mobile device application data 220, runtime mobile application data 222, and network activity data 224 may be input to the general threat model 242 for training and/or processing.

The general web-reputation model 804 may include functionality similar to that described above relative to the IP reputation model 228, the URL reputation model 230, and the webpage content classification model 232. The general executable malware/virus model 808 may include functionality similar to that described above relative to the executable malware/virus model 236. The general device application malware/virus model 812 may include functionality similar to that described above relative to the mobile device application malware/virus model 238.

The general web reputation model 804, the general executable malware/virus model 808, and the general device application malware/virus model 812 may all determine threat assessment scores based on an analysis of the IP addresses 204, URLs 206, HTML content 208, Geo-location information 210, Internet Service Provider (ISP) data 112, who-is data 214, static executable data 216, runtime executable data 218, static mobile device application data 220, runtime mobile application data 222, and network activity data 224. The threat assessment scores may be sent to the final threat model 816 where the threat assessment scores are combined to create a final threat assessment score 820. The final threat assessment score 820 may be sent to an intermediate model 244.

Figure 9:
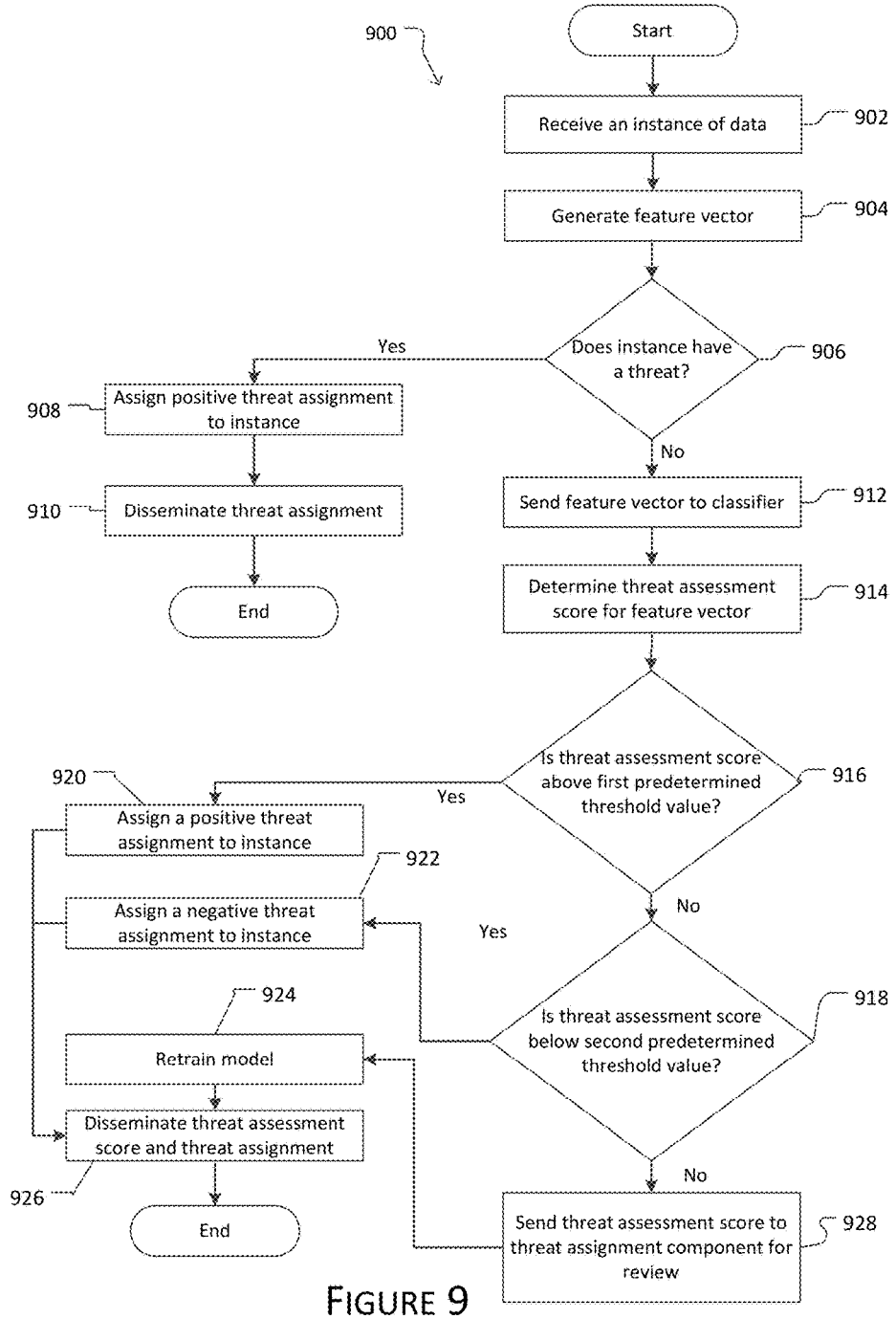
FIG. 9 illustrates an exemplary method for detecting a threat to a computing system.

FIG. 9 illustrates an exemplary method 900 for detecting a threat of a computing system. The method 900 may be performed by a threat identification system, such as threat identification system 100, antivirus software, antimalware software, an operating system, or any other type or security related application. Additionally, the method 900 may be implemented in software (e.g., though execution of computer-executable instructions by a processor), implemented in hardware, or implemented as a combination of hardware and software. Flow begins at operation 902 where an instance of input data is received. For example, the instance of input data may be received from at least one sensor of the computing system. The instance of the input data may be received at a pre-processor to be processed and sent to a repository for storage and analysis. The instance of input data may include at least one of IP addresses, URLs, HTML content, Geo-location information, Internet Service Provider (ISP) data, who-is data, static executable data, runtime executable data, static mobile device application data, runtime mobile application data, and network activity data.

Upon receiving an instance of input data, flow continues to operation 904 where a feature vector may be generated. In embodiments, the received instance of input data may be processed to generate a representation of the instance of input data. For example, one representation of the instance of input data may include a binary representation of the instance of data. The generated representation of the instance of input data may be encoded as a feature vector by a feature vector generator.

Flow continues to operation 906 where a determination is made as to whether the received instance of input data is a threat. If it is determined that a threat is present in the instance of input data, flow branches Yes and proceeds to operation 908 where a positive threat assignment may be assigned to the instance of input data. A positive threat assignment may indicate that the instance of input data has a threat. For example, a positive threat assignment may include a reputation of a URL, a reputation of an IP address, phishing sites, malware, suspicious network activity, and suspicious applications.

After a positive threat assignment has been assigned to the instance of input data, flow proceeds to operation 910 where the positive threat assignment is disseminated. For example, the positive threat assignment may be disseminated to at least one of an endpoint device, a server, a published white-list, and/or a published black-list. When the positive threat assignment is sent to the endpoint device, the endpoint device may employ a counter measure or otherwise protect itself, data, the user, etc. when the instance is assigned a threat classification.

If it cannot be determined whether a threat is present in the instance of input data (e.g., it is unknown whether a threat exists), flow branches No and proceeds to operation 912 where the generated feature vector is sent to the classifier component. The training component may use data from the model training component to determine a threat assessment score for the generated feature vector. The model training component may include a plurality of threat assessment models. For example, the threat assessment models may include basic models, intermediate models, and a final model. The threat assessment models may be trained based on processing previously received feature vectors and threat assignments associated with other instances of input data. In this regard, the classifier module may assess the received feature vector based on data associated with other instances of input data.

At operation 914, a threat assessment score for the feature vector may be determined. For example, the classifier module may compare information contained in the feature vector with information from the threat assessment models to determine a threat assessment score for the feature vector. In one aspect, determining the threat assessment score for the feature vector includes combining information associated with the plurality of instances of input data. The threat assessment score may be based on a probability that the instance of input data is a threat.

When a threat assessment score for the feature vector is determined, flow proceeds to operation 916 where it is determined whether the threat assessment score is above a first predetermined threshold value. For example, the first predetermined threshold value may indicate the likelihood of whether the instance of input data is a threat or not. If the threat assessment score is above the first predetermined threshold value, flow proceeds to operation 920 where a positive threat assignment is assigned to the instance of input data. As discussed above, a positive threat assignment may indicate that the instance of input data has a threat. After a positive threat assignment has been assigned to the instance of input data, flow proceeds to operation 926, where the threat assessment score and the positive threat assignment are disseminated. For example, the threat assessment score and the positive threat assignment may be disseminated to at least one of an endpoint device, a server, a published white-list, and a published black-list. When the threat assessment score and positive threat assignment are sent to the endpoint device, the endpoint device may employ a counter measure or otherwise protect itself, data, the user, etc.

If the threat assessment score is not above the first predetermined threshold value, flow proceeds to operation 918 where it is determined if the threat assessment score is below a second predetermined threshold value. For example, the second predetermined threshold value may indicate the likelihood of whether the instance of input data is not a threat. If the threat assessment score is below the second predetermined threshold value, flow proceeds to operation 922 where a negative threat assignment is assigned to the instance of input data. A negative threat assignment may indicate that there is no identified threat in the instance of input data. When no threat is identified in the instance of input data, flow may proceed to operation 926 where the threat assessment score and negative threat assignment are disseminated.

If the threat assessment score is not below the second predetermined threshold value, flow proceeds to operation 928 where the threat assessment score is sent to the threat assignment component for review. The threat assessment score and corresponding feature vector may be reviewed by at least one of a human reviewer, crowd sourcing, and a third party source. In this regard, the human reviewer, crowd sourcing, and/or third party source may determine and assign either a positive or negative threat assignment for the instance of data.

When the instance of data has been assigned a threat assignment, flow proceeds to operation 924 where the model training component is retrained. For example, the feature vector and the assigned threat assignment may be sent back to the model training component such that the threat assessment models can be retrained to include the information in the feature vector and its associated threat assignment. In this regard, the threat assessment models may identify a potential threat in an instance of input data in the future that is similar to the instance of data that is used to retrain the threat assessment models. When the instance of data has been assigned a threat assignment, flow also proceeds to operation 926, where the threat assessment score and threat assignment are disseminated.

Figure 10:
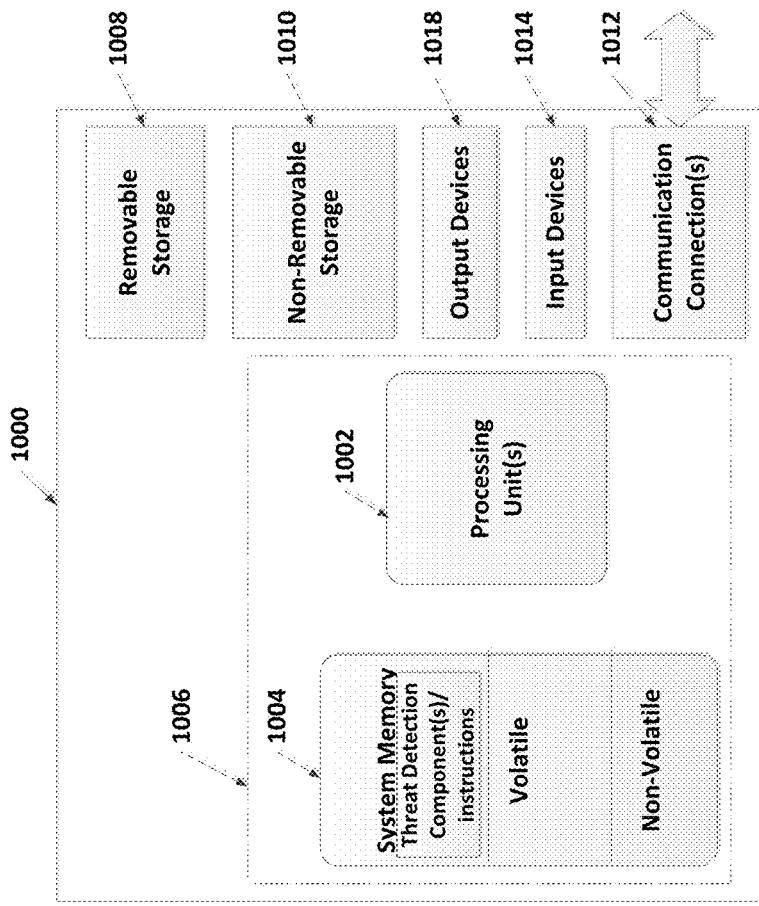
FIG. 10 illustrates one example of a suitable operating environment in which one or more of the embodiments of the present disclosure may be implemented.

FIG. 10 and the additional discussion in the present specification are intended to provide a brief general description of a suitable computing environment in which the present disclosure and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the disclosure and/or portions thereof may be practiced with other computer system configurations, including hand-held devices, multi-processor systems, microprocessor-based or programmable consumer electronics, network PCs, minicomputers, mainframe computers and the like. The disclosure may also be practiced in distributed computing environments where tasks are performed by remote processing devices that are linked through a communications network. In a distributed computing environment, program modules may be located in both local and remote memory storage devices.

FIG. 10 illustrates one example of a suitable operating environment 1000 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1000 typically includes at least one processing unit 1002 and memory 1004. Depending on the exact configuration and type of computing device, memory 1004 (storing, among other things, threat detection component(s) and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 10 by dashed line 1006. Further, environment 1000 may also include storage devices (removable, 1008, and/or non-removable, 1010) including, but not limited to, magnetic or optical disks or tape. Similarly, environment 1000 may also have input device(s) 1014 such as keyboard, mouse, pen, voice input, etc. and/or output device(s) 1016 such as a display, speakers, printer, etc. Also included in the environment may be one or more communication connections, 1012, such as LAN, WAN, point to point, etc.

Operating environment 1000 typically includes at least some form of computer readable media. Computer readable media can be any available media that can be accessed by processing unit 1002 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1000 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for detecting a threat of a computing system, the method comprising:
   receiving, by at least one computer, a plurality of instances of input data from at least one sensor;
   generating a first feature vector and a second feature vector based upon at least one instance of the plurality of instances of input data;
   sending the first feature vector and the second feature vector to a model training component of the at least one computer to train at least one threat assessment model of a plurality of threat assessment models;
   determining, based at least in part on a type of the input data, a first base model operable on the first feature vector and a second base model operable on the second feature vector, wherein the first base model accepts a different type of data than the second base model;
   generating a first threat assessment score for the first feature vector and the second feature vector using the determined first base model and the second base model;
   determining at least one intermediate model that receives one or more scores from at least one of the first base model and the second base model, based at least in part on the type of the input data;
   generating, by a classifier of the at least one computer, a second threat assessment score using the at least one intermediate model based on the first threat assessment score;

assigning a threat assignment to the at least one instance of input data based on the second threat assessment score; and disseminating the threat assignment and at least one of the first threat assessment score and the second threat assessment score, wherein the threat assignment is used to determine whether to employ a countermeasure.

2. The method of claim 1, wherein the threat assignment is assigned to the at least one instance of input data by determining whether the second threat assessment score is above a first predetermined threshold or below a second predetermined threshold value.

3. The method of claim 2, wherein a positive threat assignment is assigned to the at least one instance of input data when the second threat assessment score is above the first predetermined threshold, and wherein a negative threat assignment is assigned to the at least one instance of input data when the second threat assessment score is below the second predetermined threshold.

4. The method of claim 2, further comprising sending at least one of the first threat assessment score and the second threat assessment score to a threat assignment component.

5. The method of claim 4, wherein when the second threat assessment score is between the first predetermined threshold and the second predetermined threshold, the method further comprises:
reviewing at least one of the generated first feature vector and the second feature vector, and at least one of the first threat assessment score and the second threat assessment score; and
assigning a threat assignment to the at least one instance based on the review.

6. The method of claim 5, further comprising:
sending the assigned threat assignment and the at least one generated feature vector to the model training component.

7. The method of claim 6, further comprising retraining the plurality of threat assessment models in response to sending the threat assignment and the at least one generated feature vector to the model training component.

8. The method of claim 1, wherein the threat assignment and at least one of the first threat assessment score and the second threat assessment score are sent to at least one of an endpoint device, a server, a published white-list, and a published black-list.

9. A non-transitory computer storage medium encoding computer executable instructions that, when executed by at least one processor, perform a method for detecting a threat of a computing system, the method comprising:
receiving, by at least one computer, a plurality of instances of input data from at least one sensor;
generating a first feature vector and a second feature vector based upon at least one instance of the plurality of instances of input data;
sending the first feature vector and the second feature vector to a model training component of the at least one computer to train at least one threat assessment model of a plurality of threat assessment models;
determining, based at least in part on a type of the input data, a first base model operable on the first feature vector and a second base model operable on the second feature vector, wherein the first base model accepts a different type of data than the second base model;
generating a first threat assessment score for the first feature vector and the second feature vector using the determined first base model and the second base model;
determining at least one intermediate model that receives one or more scores from the at least one of the first base model and the second base model, based at least in part on the type of the input data;
generating, by a classifier of the at least one computer, a second threat assessment score using the at least one intermediate model based on the first threat assessment score;
when the second threat assessment score is above a first predetermined threshold value or below a second predetermined threshold value, automatically assigning a threat assignment to the at least one instance based on the second threat assessment score; and
disseminating the threat assignment and at least one of the first threat assessment score and the second threat assessment score, wherein the threat assignment is used to determine whether to employ a countermeasure.

10. The non-transitory computer storage medium of claim 9, wherein a positive threat assignment is assigned to the at least one instance of input data when the second threat assessment score is above the first predetermined threshold, and wherein a negative threat assignment is assigned to the at least one instance of input data when the second threat assessment score is below the second predetermined threshold.

11. The non-transitory computer storage medium of claim 10, the method further comprising sending at least one of the first threat assessment score and the second threat assessment score to a threat assignment component.

12. The non-transitory computer storage medium of claim 11, wherein when the second threat assessment score is between the first predetermined threshold and the second predetermined threshold, the method further comprises:
reviewing at least one of the generated first feature vector, the second feature vector, the input data, third party data, the first threat assessment score, and the second threat assessment score; and
assigning a threat assignment to the at least one instance based on the review.

13. The non-transitory computer storage medium of claim 12, the method further comprising:
sending the assigned threat assignment and at least one of the generated first feature vector and the second feature vector to the model training component.

14. The non-transitory computer storage medium of claim 13, the method further comprising retraining the plurality of threat assessment models in response to sending the threat assignment and the at least one generated feature vector to the model training component.

15. The non-transitory computer storage medium of claim 9, wherein determining the first threat assessment score for the first feature vector and the second feature vector further comprises:
calculating a probability that the at least one instance is a threat.

16. The non-transitory computer storage medium of claim 9, wherein the threat assignment and at least one of the first threat assessment score and the second threat assessment score are sent to at least one of an endpoint device, a server, a published white-list, and a published black-list.

17. The non-transitory computer storage medium of claim 12, wherein the at least one generated feature vector and at least one of the first threat assessment score and the second threat assessment score are reviewed by a third party source.

18. A system comprising:
at least one processor; and memory encoding computer executable instructions that, when executed by the at least one processor, perform a method for detecting a threat of a computing system, the method comprising:

receiving, by at least one computer, a plurality of instances of input data from at least one sensor;

generating a first feature vector and a second feature vector based upon at least one instance of the plurality of instances of input data;

determining whether the at least one instance of input data has a threat assignment;

when the at least one instance of input data has a threat assignment, sending the threat assignment and at least one of the first feature vector and the second feature vector to a threat assignment dissemination component of the at least one computer; and when the at least one instance of input data does not have a threat assignment:

sending the first feature vector and the second feature vector to a model training component of the at least one computer to train at least one threat assessment model of a plurality of threat assessment models;

determining, based at least in part on a type of the input data, a first base model operable on the first feature vector and a second base model operable on the second feature vector, wherein the first base model accepts a different type of data than the second base model;

generating a first threat assessment score for the first feature vector and the second feature vector using the determined first base model and the second base model;

determining at least one intermediate model that receives one or more scores from at least one of the first base model and the second base model, based at least in part on the type of the input data;

generating, by a classifier of the at least one computer, a second threat assessment score using the at least one intermediate model based on the first threat assessment score;

automatically assigning a threat assignment to the at least one instance of input data based on the second threat assessment score; and disseminating the threat assignment and at least one of the first threat assessment score and the second threat assessment score, wherein the threat assignment is used to determine whether to employ a countermeasure.

19. The system of claim 18, wherein when the second threat assessment score is between the first predetermined threshold and the second predetermined threshold, the method further comprises:

reviewing at least one of the first feature vector, the second feature vector, the input data, third party data, the first threat assessment score, and the second threat assessment score;

assigning a threat assignment to the at least one instance based on the review; and sending the assigned threat assignment and the at least one generated feature vector to the model training component to retrain the plurality of threat assessment models.

20. The system of claim 18, wherein the threat assignment is automatically assigned to the at least one instance of input data by determining whether the second threat assessment score is above a first predetermined threshold or below a second predetermined threshold value.

* * * * *